United States Patent [19]
Lee

[11] Patent Number: 6,034,744
[45] Date of Patent: *Mar. 7, 2000

[54] MAGNETISM SHIELD FOR CATHODE RAY TUBE

[75] Inventor: Eun Woo Lee, Seoul, Rep. of Korea

[73] Assignee: LG Electronics Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/512,687

[22] Filed: Aug. 10, 1995

[30] Foreign Application Priority Data

Aug. 11, 1994 [KR] Rep. of Korea ...................... 94-19812
Aug. 11, 1994 [KR] Rep. of Korea ...................... 94-19815

[51] Int. Cl.[7] ...................................................... H04N 5/64
[52] U.S. Cl. ............................ 348/819; 348/820; 313/479
[58] Field of Search ..................................... 348/786, 819, 348/820, 818; 313/402, 407–408, 461, 466, 479

[56] References Cited

U.S. PATENT DOCUMENTS

| | | | |
|---|---|---|---|
| 4,217,520 | 8/1980 | Sugarman | 313/472 |
| 4,692,659 | 9/1987 | Takenaka et al. | 313/407 |
| 4,710,670 | 12/1987 | Dougherty et al. | 313/407 |
| 5,170,093 | 12/1992 | Yamamoto et al. | |
| 5,199,984 | 4/1993 | Jeong | 313/466 |
| 5,235,243 | 8/1993 | Tong | 313/479 |
| 5,434,470 | 7/1995 | DeWit et al. | 313/479 |
| 5,459,445 | 10/1995 | Je | 335/214 |
| 5,474,068 | 12/1995 | Muto | 313/461 |
| 5,489,816 | 2/1996 | Lee | 313/466 |
| 5,530,316 | 6/1996 | Haga et al. | 313/402 |
| 5,532,545 | 7/1996 | Okamoto et al. | 313/407 |
| 5,547,411 | 8/1996 | Lee | 445/52 |
| 5,644,191 | 7/1997 | DeWit et al. | 313/402 |
| 5,677,592 | 10/1997 | Choi et al. | 313/408 |
| 5,757,119 | 5/1998 | Togawa | 313/408 |

FOREIGN PATENT DOCUMENTS 1140539  6/1989  Japan .

*Primary Examiner*—Kim Yen Vu

[57] ABSTRACT

A magnetism shield for a color cathode ray tube is disclosed including: a shadow mask through which an electron beam passes; a mask frame to which the shadow mask is fixed; an inner shield fixed to the mask frame and for preventing the path of the electron beam from being distorted due to magnetism; a panel; a phosphorous surface formed on the inner surface of the panel; and means for shielding an area placed between the shadow mask and phosphorous surface.

16 Claims, 3 Drawing Sheets

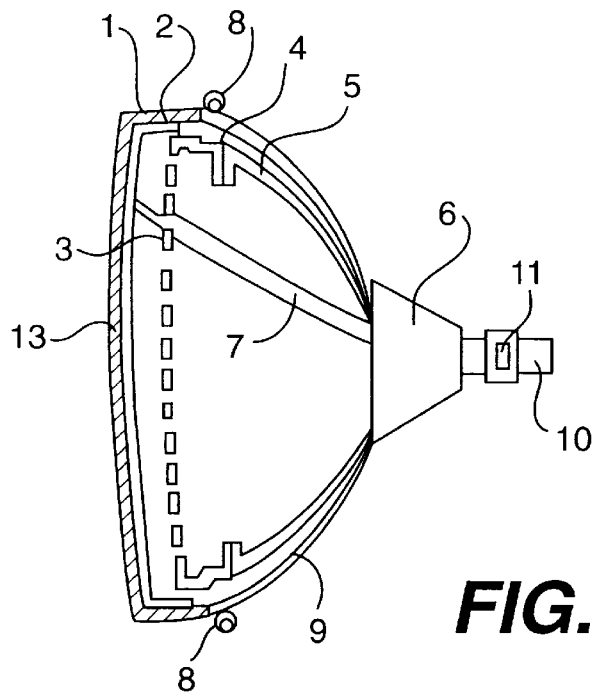
FIG. 3
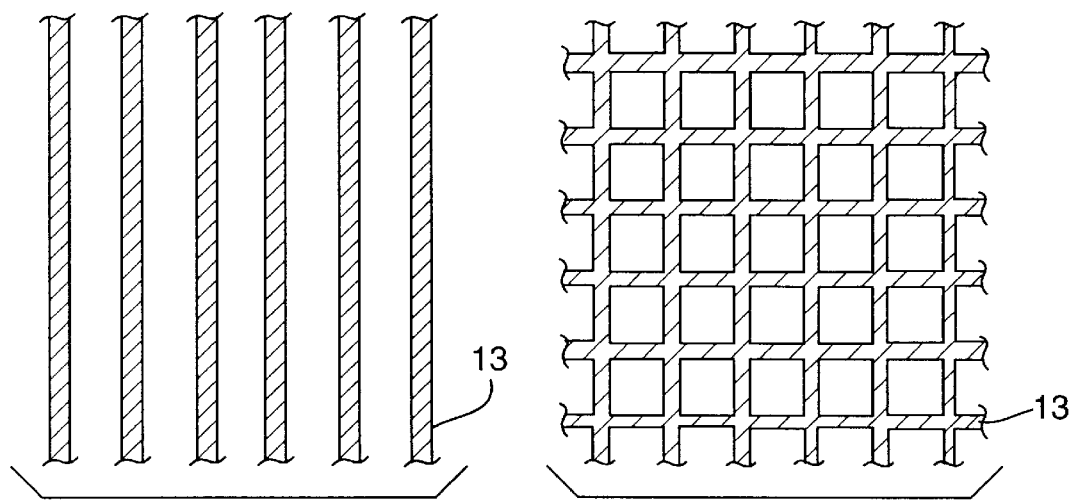
FIG. 4A  FIG. 5A
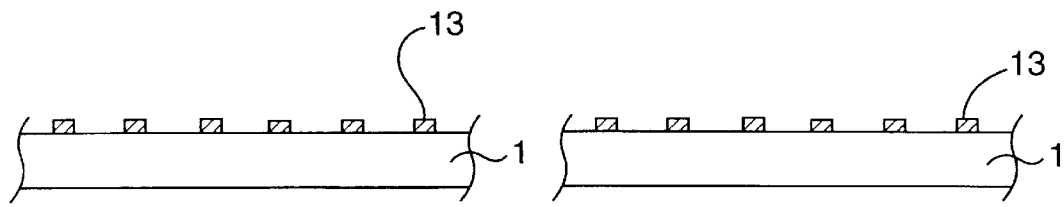
FIG. 4B  FIG. 5B

MAGNETISM SHIELD FOR CATHODE RAY TUBE

BACKGROUND OF THE INVENTION

The present invention relates to a color cathode ray tube having a magnetism shield, and more particularly, to a color cathode ray tube having a magnetism shield, which is capable of protecting the inside of the color cathode ray tube from an environmental magnetic field.

Generally speaking, in a conventional color cathode ray tube, red, green and blue phosphors are rendered luminescent by a video signal in order to realize a color image. As shown in FIG. 1, such a conventional color cathode ray tube is made in the outer form of a bulb in which a panel 1 and funnel 9 are integrally formed. Inside a neck 10 placed at the rear of funnel 9 is provided an electron gun 11 for emitting red, green and blue electron beams 7. In panel 1, a mask frame 4 is supported by a plurality of support springs (not shown). On the panel side of mask frame 4, a shadow mask 3 is fixed to selectively pass the electron beams emitted from the electron gun. On the funnel side of mask frame 4, an inner shield 5 is secured to prevent the electron beams emitted from the electron gun from being distorted due to a terrestrial magnetic field or a leakage magnetic field. A phosphorous surface 2 coated with phosphors is formed on the inner surface of panel 1 so that the electron beams passing through shadow mask 3 collide with the phosphorous surface to form an image. The phosphorous surface 2 is divided into a pixel portion of red, green and blue phosphors for realizing red, green and blue color information, and a black matrix of graphite for shielding light between pixels.

In such a conventional color cathode ray tube, an environmental magnetic field caused due to the difference of a terrestrial magnetic field or due to sources of creating an abnormal magnetic field inside or outside a television or monitor, alters the path movement of the electron beams that extremely affecting color purity, convergence, raster displacement, and the like. For this reason, a shield mechanism made of ferromagnetic substance, such as shadow mask 3, mask frame 4 and inner shield 5, is incorporated in the form of a magnetic closed loop X in the conventional color cathode ray tube, as shown in FIG. 2.

FIG. 2 is intended to explain the magnetism shielding function of such a magnetic closed loop. According to this drawing, environmental magnetic field Y like the terrestrial magnetic field entering magnetic closed loop X is shielded by the magnetic closed loop X so that the inside of the magnetic closed loop X becomes a non-magnetic field area.

However, according to the environmental magnetic closed loop X of the conventional color cathode ray tube, only the area surrounding the shadow mask 3, mask frame 4 and inner shield 5, becomes the magnetic shield area not the overall inside area of the conventional color cathode ray tube. Until electron beams 7 deviate from the magnetic closed loop X and then reach phosphorous surface 2 from shadow mask 3, the path movement of the electron beams is distorted due to the environmental magnetic field, thus, deteriorating quality such as color purity, as described above. Especially, the magnetic closed loop of the conventional cathode ray tube cannot exhibit the shielding function against the environmental magnetic field coming externally from the phosphorous surface 2.

If the distance between the shadow mask and the phosphorous surface is small, no problems will exist. However, in a color cathode ray tube using a shadow mask, the distance of about 10 mm is required in the operation configuration so that the space between shadow mask 3 and phosphorous surface 2 is unable to escape from the effect of the outer environmental magnetic field.

SUMMARY OF THE INVENTION

Accordingly, the present invention is directed to a magnetism shield for a color cathode ray tube that substantially obviates one or more of the problems due to limitations and disadvantages of the related art. An object of the present invention to provide a magnetism shield for a color cathode ray tube, which protects the area between a shadow mask and a phosphorous surface from a environmental magnetic field.

To achieve these and other advantages and in accordance with the purpose of the present invention, as embodied and broadly described there is provided a magnetism shield for a color cathode ray tube comprising: a shadow mask through which an electron beam passes; a mask frame to which the shadow mask is fixed; an inner shield fixed to the mask frame and for preventing the path of the electron beam from being distorted due to magnetism; a panel; a phosphorous surface formed on the inner surface of the panel; and means for shielding an area placed between the shadow mask and phosphorous surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The present invention will become more fully understood from the detailed description given hereinbelow and the accompanying drawings which are given by way of illustration only, and thus are not limitative of the present invention, and wherein:

FIG. 3 is a vertical sectional view of a color cathode ray tube according to an embodiment of the present invention;

FIG. 4A is a plan view of one embodiment of a magnetism shielding layer of the color cathode ray tube according to the present invention;

FIG. 4B is a sectional view of the first embodiment of magnetism shielding layer of the color cathode ray tube of the present invention;

FIG. 5A is a plan view of another embodiment of magnetism shielding layer of the color cathode ray tube of the present invention;

FIG. 5B is a sectional view of the second embodiment of magnetism shielding layer of the color cathode ray tube of the present invention;

DETAILED DESCRIPTION OF THE INVENTION

Figure 1:
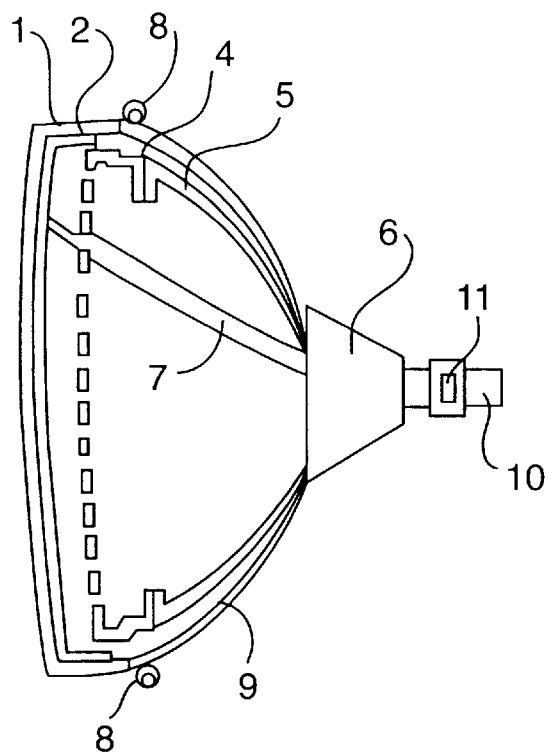
FIG. 1 is a vertical sectional view of a conventional color cathode ray tube.
Figure 2:
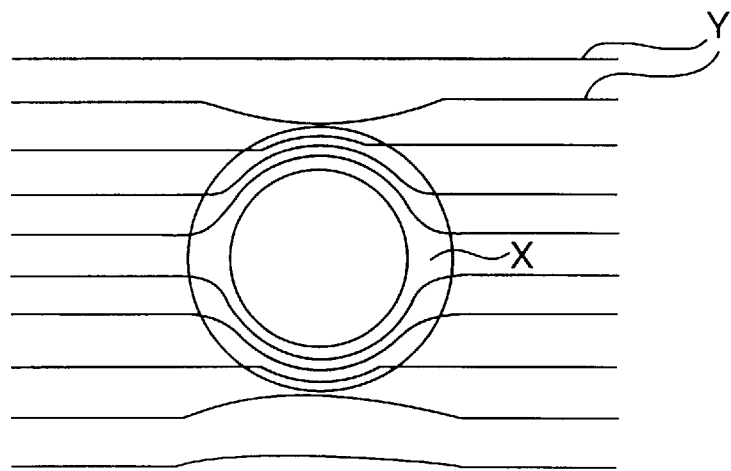
FIG. 2 illustrates a magnetism shielding function by a magnetic closed loop of the conventional color cathode ray tube.

Reference will now be made in detail to the preferred embodiments of the present invention, examples of which are illustrated in the accompanying drawings.

Referring to FIG. 3, the color cathode ray tube of the present invention having outer form of a bulb integrally forms a panel 1 and funnel 9 having a neck 10 at the rear thereof. An electron gun 11 for emitting red, green and blue electron beams 7 is installed inside the neck 10. A deflection yoke 6 for horizontally and vertically deflecting electron beams 7 emitted from the electron gun is provided on the outer circumference of the neck 10. A mask frame 4 is supported by a plurality of support springs (not shown) in the panel 1. A shadow mask 3 for selectively passing the electron beams emitted from the electron gun is fixed to the panel side of mask frame 4. An inner shield 5 for preventing the electron beams emitted from the electron gun from being distorted due to a terrestrial magnetic field or a leakage magnetic field is fixed to the funnel side of the mask frame 4. A phosphorous surface 2 coated with phosphor is formed on the inner side of panel 1 so that the electron beams passing through shadow mask 3 collide with the phosphorous surface; thereby forming an image.

A magnetic-field shielding layer 13 made of a soft magnetic material is formed on the outer surface of panel 1 of the color cathode ray tube of the present invention. For the soft magnetic material, a soft magnetic metal of an Fe—Ni alloy system having high permeability may be used. The soft magnetic metal is below 0.02 Oe in coercivity and hundreds of thousand this (H/M) for maximum permeability. The soft magnetic metal is excellent for its magnetism shielding effect, and has good adhesion to the panel 1.

Magnetic-field shielding layer 13 may be formed in a grill or matrix form, as shown in FIGS. 4A–5B, by photoetching. This layer may also be formed as a continuous thin film instead of a discontinuous layer such as the grill or matrix form.

In order to prevent light incident on the outer surface of panel 1 from being reflected, a non-reflecting material such as $Cr_2O_3$ is coated on the bottom of magnetic-field shielding layer 13 as a multilayer thin film.

For another embodiment of the present invention, the material of the black matrix of the phosphorous surface may be formed different from that of the conventional magnetism shield.

Figure 6A:
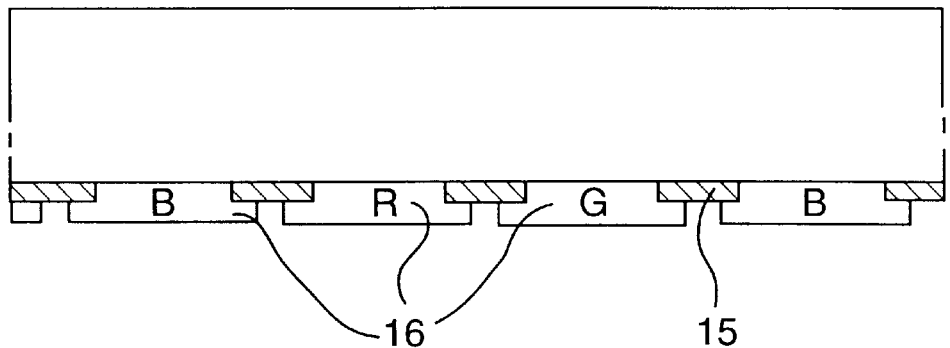
FIG. 6A is a plan view of the phosphorous surface of the present invention.
Figure 6B:
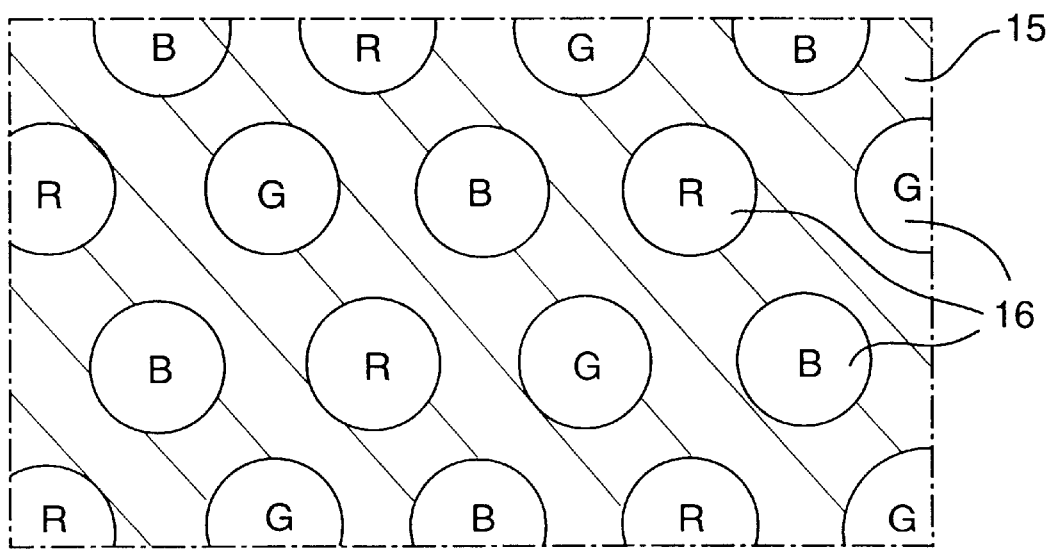
FIG. 6B is a sectional view of the phosphorous surface of the present invention.

As shown in FIGS. 6A and 6B, the phosphorous surface 2 of the color cathode ray tube of the present invention consists of pixels 16 of red, green and blue phosphors for realizing red, green and blue color information, and a black matrix 15 made from a soft magnetic material for shielding light between the respective pixels. For the soft magnetic material of black a material having a high permeability such as a soft magnetic metal in an Fe—Ni alloy system matrix 15, may be used. This type of soft magnetic metal is below 0.02 Oe in coercivity, and hundreds of thousand this (H/M) for maximum permeability, and has excellent magnetism shielding effect. Black matrix 15 may be formed by evaporating the soft magnetic metal in a vacuum.

In order to enhance the effect of the black matrix, non-reflecting material such as $Cr_2O_3$ may be formed as a multilayer thin film on the bottom of a diamagnetic substance such as the above-mentioned soft magnetic metal.

As described above, in the magnetism shield for color cathode ray tube of the present invention, the conventional magnetic closed loop formed with the shadow mask 3, mask frame 4 and inner shield 5 can be extended to the phosphorous surface 2. By doing so, the inside and outside of a color cathode ray tube including a space between shadow mask 3 to phosphorous surface 2 can be shielded from the environmental magnetic field or the terrestrial magnetic field. Accordingly, the present invention can prevent the color purity of color cathode ray tube from being degraded, facilitating product development and production management due to the enhancement of magnetism shielding capability. Magnetic shielding layer 13 also functions as a conductive layer, involving an anti-static effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cathode ray tube comprising:
    a shadow mask in which an electron beam passes therethrough;
    a mask frame to which said shadow mask is fixed;
    a panel having a phosphorous surface; and
    a magnetic shield constructed and arranged to shield an area between said shadow mask and said panel from a magnetic field, said magnetic shield comprising a black matrix film formed on an inner side of said panel, said black matrix being made from a soft magnetic metallic material.

2. The cathode ray tube as claimed in claim 1, further comprising an inner shield fixed to said mask frame for shielding an area within the inner shield from a magnetic field.

3. The cathode ray tube as claimed in claim 1, wherein said phosphorous surface is formed on an inner surface of said panel.

4. The cathode ray tube as claimed in claim 1, wherein said black matrix film comprises a soft, highly permeable magnetic thin film stacked on a non-reflecting film on an inner side of said panel.

5. The cathode ray tube of claim 1, wherein said magnetic shield provides a shield against an external magnetic field.

6. A cathode ray tube comprising:
    a shadow mask in which an electron beam passes therethrough;
    a mask frame to which said shadow mask is fixed;
    a panel having a phosphorous surface; and
    a magnetic shield constructed and arranged to shield an area between said shadow mask and said panel from a magnetic field, wherein said magnetic shield is a magnetic shielding layer made from a soft magnetic substance having high permeability and formed on an outer surface of said panel.

7. The cathode ray tube as claimed in claim 6, wherein said magnetic shielding layer is made from a soft magnetic Fe—Ni metal alloy system having a high permeability.

8. The cathode ray tube as claimed in claim 6, wherein said shielding layer includes a multilayer thin film, the multilayer thin film comprising a soft magnetic thin film stacked on a non-reflecting material.

9. The cathode ray tube as claimed in claim 6, wherein said shielding layer is a continuous thin film.

10. The cathode ray tube as claimed in claim 6, wherein said shielding layer is formed in at least one of a grill shape and a matrix shape.

11. A method of illuminating a phosphorous screen of a cathode ray tube, the method comprising the steps of:

generating an electron beam;

passing the electron beam through a shadow mask;

shielding the electron beam in an area between the shadow mask and the phosphorous screen from a magnetic field with a black matrix film made from a high permeability soft magnetic metallic material, provided on an inner side of the phosphorous screen; and selectively illuminating the phosphorous screen with the electron beam.

12. The method of claim 11, wherein said shielding step comprises shielding the electron beam from an external magnetic field.

13. The method of claim 11, wherein the high permeability soft magnetic metallic material is a Fe—Ni metal alloy.

14. A method of illuminating a phosphorous screen of a cathode ray tube, the method comprising the steps of:

generating an electron beam;

passing the electron beam through a shadow mask;

shielding the electron beam in an area between the shadow mask and the phosphorous screen from a magnetic field; and selectively illuminating the phosphorous screen with the electron beam, wherein said shielding step comprises shielding the electron beam with a shielding layer formed on an outer surface of the phosphorous screen.

15. The method of claim 14, wherein the shielding layer comprises a high permeability, soft magnetic material film and a non-reflecting $Cr_2O_3$ film.

16. The method of claim 14, wherein the shielding layer has one of a grill shape and a matrix shape.

* * * * *